(12) United States Patent
Taira (10) Patent No.: US 10,496,197 B2
(45) Date of Patent: Dec. 3, 2019

(54) ELECTRONIC DEVICE (71) Applicant: Onkyo Corporation, Neyagawa-shi (JP)

(72) Inventor: Kazuhiko Taira, Neyagawa (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 15/913,595

(22) Filed: Mar. 6, 2018

(65) Prior Publication Data
US 2018/0259994 A1 Sep. 13, 2018

(30) Foreign Application Priority Data

Mar. 6, 2017 (JP) ................................. 2017-042199

(51) Int. Cl.
*G06F 3/0362* (2013.01)
*G06F 1/16* (2006.01)
*G05G 1/10* (2006.01)
*H04M 1/23* (2006.01)
*G06F 3/0484* (2013.01)

(52) U.S. Cl.
CPC ............. *G06F 3/0362* (2013.01); *G05G 1/10* (2013.01); *G06F 1/169* (2013.01); *G06F 1/1684* (2013.01); *G06F 3/04847* (2013.01); *H04M 1/233* (2013.01)

(58) Field of Classification Search
CPC ...... G06F 1/1684; G06F 1/169; G06F 3/0362; G06F 3/04847; H04M 1/233
See application file for complete search history.

(56) References Cited

U.S. PATENT DOCUMENTS

| 7,202,806 | B2 * | 4/2007 | Mukaida | ................ A63H 30/04 340/12.5 |
| 7,382,066 | B2 * | 6/2008 | Foster | .................... H01H 19/03 307/139 |
| 2010/0081478 | A1 * | 4/2010 | Itoh | ....................... G06F 1/1616 455/566 |
| 2014/0087791 | A1 * | 3/2014 | Park | ...................... G06F 1/1626 455/566 |
| 2016/0216801 | A1 * | 7/2016 | Shedletsky | ............. G06F 3/044 |

FOREIGN PATENT DOCUMENTS

WO     WO 2002/094405     11/2002

OTHER PUBLICATIONS

Search Report issued in European Application 18158488.9-1221 dated Jul. 16, 2018.
Gil, L., "How to Change the Mouse Settings on your Mac", imore.com, URL: https://www.imore.com/how-change-trackpad-settings-your-mac, 7 Pages total, (Jun. 11, 2016).

* cited by examiner

*Primary Examiner* — Nidhi Thaker
(74) *Attorney, Agent, or Firm* — Xsensus, LLP (57) ABSTRACT

An electronic device that includes a rotary operator that changes a parameter value of the device itself, the rotary operator having a first contact region and a second contact region positioned on an opposite side of the first contact region with respect to a rotation axis of the rotary operator and being rotatably operated in such a manner that a finger of a user slides in a circumferential direction of the rotary operator with the finger contacting any of the first and second contact regions; and a changing direction setting unit that sets a changing direction of the parameter value with respect to a rotation direction of the rotary operator.

11 Claims, 9 Drawing Sheets

ELECTRONIC DEVICE

CROSS-REFERENCE TO RELATED APPLICATIONS

This application claims priority to Japanese Application No. 2017-042199, filed Mar. 6, 2017, the entire contents of which are incorporated herein by reference.

FIELD

The present disclosure relates to an electronic device, and specifically relates to an electronic device including a rotary operator for changing a parameter value of the electronic device.

BACKGROUND

Typically, an electronic device has been known, the electronic device including a rotary operator which can change a parameter value of the electronic device. Generally, a parameter value changing direction with respect to a rotation direction of the rotary operator is uniquely set. For example, in the case of rotating the rotary operator in a forward direction (e.g., a clockwise direction), the parameter value changes in one direction (e.g., the direction of increasing the parameter value). In the case of rotating the rotary operator in a reverse direction (e.g., a counterclockwise direction), the parameter value changes in the other direction (e.g., the direction of decreasing the parameter value).

Moreover, an electronic device has been also proposed, which is configured so that a rotary operator can be suitably operated regardless of a right-handed or left-handed user. For example, WO 2002/094405 discloses a control transmitter for a radio-controlled toy car (a so-called radio control toy), the control transmitter including, on a right surface, a right-handed wheel for controlling steering of the toy car and similarly including, on a left surface, a left-handed wheel for controlling steering of the toy car. The right-handed wheel and the left-handed wheel are connected with the same shaft. In such a control transmitter, a right-handed user holds, after having operated the control transmitter in a right-handed mode, a grip with the left hand while rotating the right-handed wheel with the right hand. In this state, when the right-handed wheel is rotated clockwise as viewed from the right, the toy car turns right. On the other hand, a left-handed user holds, after having operated the control transmitter in a left-handed mode, the grip with the right hand while rotating the left-handed wheel with the left hand. In this state, when the left-handed wheel is rotated clockwise as viewed from the left, the toy car turns right. Since the right-handed wheel and the left-handed wheel are connected with the same shaft, a rotation direction of the shaft is opposite between clockwise rotation of the right-handed wheel and clockwise rotation of the left-handed wheel. Thus, in this control transmitter, a steering changing direction with respect to the rotation direction of the shaft is switched between the right-handed mode and the left-handed mode.

SUMMARY

In some cases, a rotary operator is attached to an electronic device such that a finger of a user slides in a circumferential direction of the rotary operator to rotatably operate the rotary operator while contacting a portion (a contact region) of the rotary operator. Further, such a rotary operator can be, in some cases, rotatably operated while the finger of the user is contacting any of a first contact region and a second contact region positioned on the opposite side of the first contact region with respect to a rotation axis of the rotary operator. The first contact region and the second contact region are, for example, front and back regions, right and left regions, or upper and lower regions of the rotary operator.

In a case where an attempt is made to rotate, in a certain direction, the rotary operator attached to the electronic device in the above-described form, a finger sliding direction is different between the case of rotatably operating the rotary operator with the finger contacting the first contact region and the case of rotatably operating the rotary operator with the finger contacting the second contact region. This will be described with reference to FIG. 9.

Figure 9:
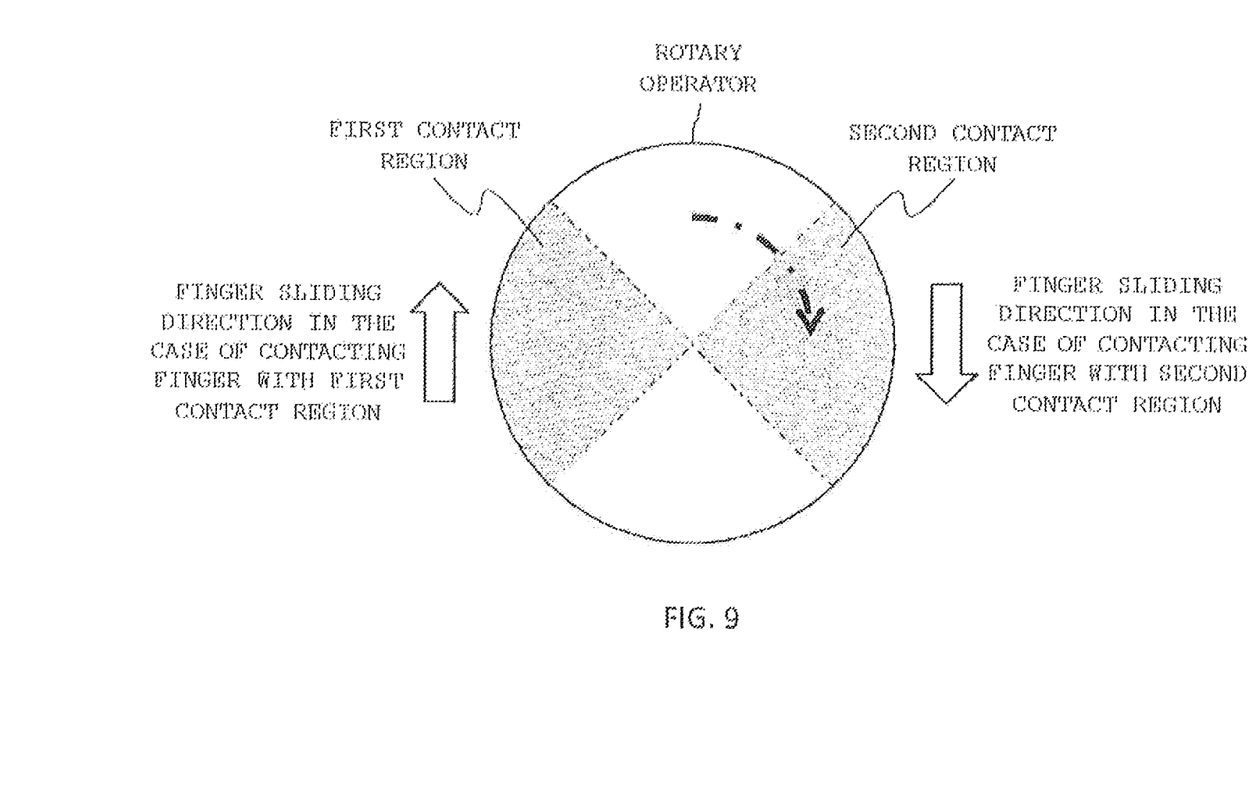
FIG. 9 is a conceptual diagram of a difference in a finger sliding direction upon rotary operation of a rotary operator between a case where a finger contacts a first contact region and a case where a finger contacts a second contact region.

A rotary operator illustrated in FIG. 9 has a first contact region as a left region of FIG. 9, and a second contact region as a right region of FIG. 9. Note that the first contact region and the second contact region include a side surface of the rotary operator.

The case of attempting to rotate the rotary operator in the clockwise direction as viewed in FIG. 9 will be described herein. In the case of rotatably operating the rotary operator with a finger contacting the first contact region (e.g., a left surface of the rotary operator), a user upwardly slides, as viewed in FIG. 9, the finger contacting the first contact region of the rotary operator. On the other hand, in the case of rotatably operating the rotary operator with the finger contacting the second contact region (e.g., a right surface of the rotary operator), the user downwardly slides, as viewed in FIG. 9, the finger contacting the second contact region of the rotary operator.

Note that the first contact region and the second contact region are illustrated in FIG. 9 by way of example, and the areas of the first contact region and the second contact region are not limited to those illustrated in FIG. 9. Two contact regions where a finger sliding direction is opposite to each other when the rotary operator is rotated in a certain direction are the first contact region and the second contact region.

As described above, even in a case where an attempt is made to rotate the rotary operator in the same direction, the finger sliding direction varies depending on whether the rotary operator is rotatably operated with the finger contacting the first contact region or the second contact region. For this reason, intuitive inconsistency between the direction of changing a parameter value by the rotary operator and the user's finger movement direction might be caused. For example, in an example of FIG. 9, in a case where the parameter value increases when the rotary operator is rotated in the clockwise direction, if the rotary operator is rotatably operated with the finger contacting the first contact region, the operation of sliding the finger "upward" and the parameter value changing direction of "increasing" the parameter value are intuitively consistent with each other. On the other hand, if the rotary operator is rotatably operated with the finger contacting the second contact region, the operation of sliding the finger "downward" and the parameter value changing direction of "increasing" the parameter value are not intuitively consistent with each other.

An objective of the present disclosure is to realize intuitive consistency between the direction of changing a parameter value by a rotary operator having a first contact region and a second contact region and a user's finger sliding direction even in a case where a user rotatably operates the rotary operator with a finger contacting any of the first contact region and the second contact region.

The present disclosure is an electronic device including: a rotary operator configured to change a parameter value of the device itself, the rotary operator having a first contact region and a second contact region positioned on the opposite side of the first contact region with respect to a rotation axis of the rotary operator and being rotatably operated in such a manner that a finger of a user slides in a circumferential direction of the rotary operator with the finger contacting any of the first and second contact regions; and a changing direction setting unit configured to set a changing direction of the parameter value with respect to a rotation direction of the rotary operator.

Preferably, the electronic device is a portable electronic device holdable with one hand, and the rotary operator is rotatably operated with a finger of the one hand holding the electronic device.

Preferably, the rotary operator rotates in a rotation plane perpendicular to a front surface of the electronic device; and the first contact region is a region positioned on a front side of the electronic device, and the second contact region is a region positioned on a back side of the electronic device.

Preferably, the rotary operator is provided on one side of the electronic device.

Preferably, the electronic device further includes a display unit configured to display the direction of changing the parameter value by operation of the rotary operator.

Preferably, the changing direction setting unit determines the parameter value changing direction according to the rotation direction of the rotary operator in a case where the rotary operator is rotatably operated after predetermined operation has been performed for the electronic device.

Preferably, the electronic device further includes a parameter value setting unit configured to change the parameter value based on the parameter value changing direction set by the changing direction setting unit, the rotation direction of the rotary operator, and a rotation angle of the rotary operator, the parameter value setting unit changing the parameter value such that the amount of change in the parameter value per unit rotation angle in the case of setting the parameter value changing direction to a first changing direction and the amount of change in the parameter value per unit rotation angle in the case of setting the parameter value changing direction to a second changing direction are different from each other.

According to the present disclosure, the intuitive consistency between the direction of changing the parameter value by the rotary operator having the first contact region and the second contact region and the user's finger sliding direction can be realized even in a case where the user rotatably operates the rotary operator with the finger contacting any of the first contact region and the second contact region.

DETAILED DESCRIPTION

Hereinafter, an embodiment of the present disclosure will be described.

Figure 1:
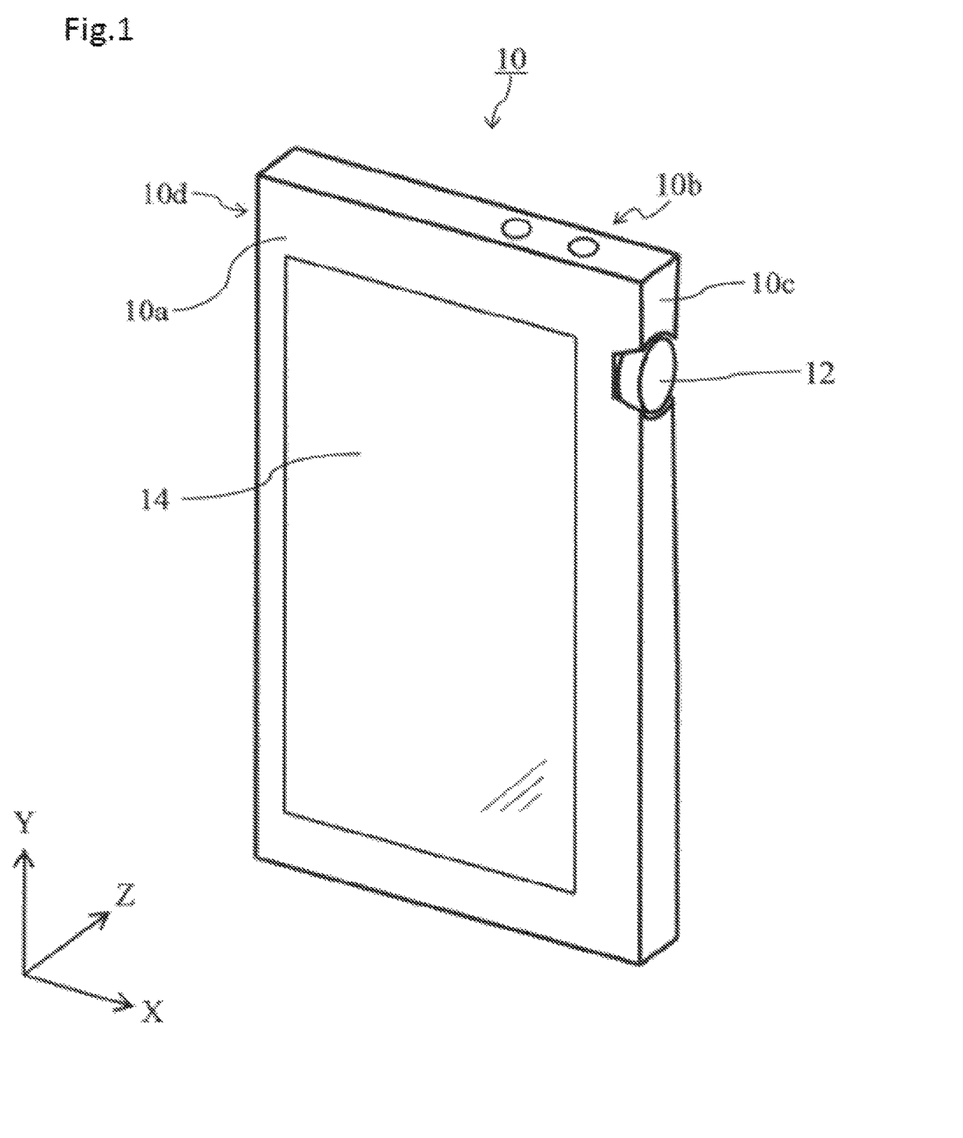
FIG. 1 is a perspective view of an outer appearance of a portable electronic device according to an embodiment.

FIG. 1 illustrates a perspective view of an outer appearance of a portable electronic device 10 as an electronic device of the present embodiment. Hereinafter, an example where the electronic device is the portable electronic device 10, more specifically a portable audio player, will be described with reference to the present embodiment, but the electronic device of the present disclosure is not limited to such a device. For example, a stationary electronic device may be employed. Note that in FIG. 1 and other figures, a right-to-left direction of the portable electronic device 10 is an X-axis, an upper-to-lower direction is a Y-axis, and a front-to-back direction is a Z-axis. Hereinafter, a side in a positive direction of the X-axis will be described as a "right side," a side in a negative direction of the X-axis will be described as a "left side," a side in a positive direction of the Y-axis will be described as an "upper side," a side in a negative direction of the Y-axis will be described as a "lower side," a side in a positive direction of the Z-axis will be described as a "back side," and a side in a negative direction of the Z-axis will be described as a "front side."

The portable electronic device 10 has a substantially rectangular parallelepiped shape. That is, the portable electronic device 10 includes a front surface 10a, a back surface 10b, a right surface 10c, and a left surface 10d. Although reference numerals are not shown in FIG. 1, the portable electronic device 10 has, needless to say, an upper surface and a lower surface.

The portable electronic device 10 is provided with a rotary operator 12. In the present embodiment, the rotary operator 12 is provided on the side close to the right surface 10c of the portable electronic device 10. Moreover, the rotary operator 12 is provided at a position slightly on the upper side of the portable electronic device 10. This is because a user generally holds the portable electronic device 10 on the lower side with respect to the center in the upper-to-lower direction, and therefore, arrangement of the rotary operator 12 slightly on the upper side further improves operability of the rotary operator 12.

The rotary operator 12 is for changing a parameter value of the portable electronic device 10. In the present embodiment, it is described that the rotary operator 12 is for changing a volume value of the portable electronic device 10, but the rotary operator 12 may be used for changing other parameter values. For example, the rotary operator 12 may be used for changing a tone parameter, changing selected music, or changing a selected item on a menu screen etc. Alternatively, a parameter of which value is changed by rotation of the rotary operator 12 may be changeable by user setting.

A display unit 14 is provided on the front surface 10a of the portable electronic device 10. The display unit 14 will be described later in detail. Although not described in detail herein, the portable electronic device 10 includes a headphone jack for connection with headphones or earphones, a terminal connection unit for connection with a personal computer etc., and an external memory connection unit for connection with an external memory (e.g., a SD card) storing music data.

The portable electronic device 10 of the present embodiment is relatively small, and the user can hold the portable electronic device 10 with one hand. Moreover, the user can operate the rotary operator 12 with a finger of one hand while holding the portable electronic device 10 with the one hand. As described above, it is assumed that the portable electronic device 10 is held with one hand of the user and that the rotary operator 12 is rotatably operated with the finger of the one hand holding the portable electronic device 10.

Figure 2:
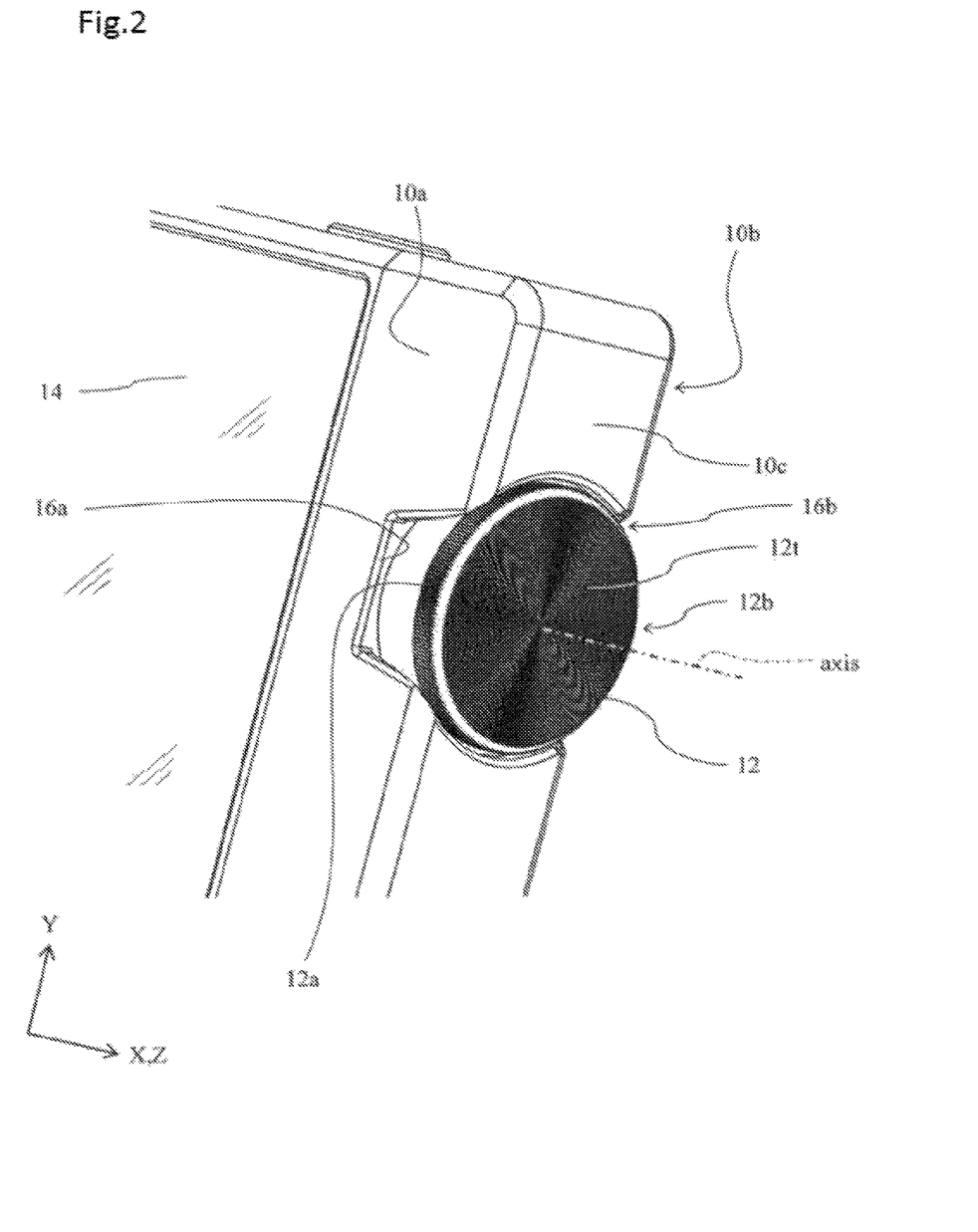
FIG. 2 is an enlarged perspective view of a rotary operator according to the embodiment.
Figure 3:
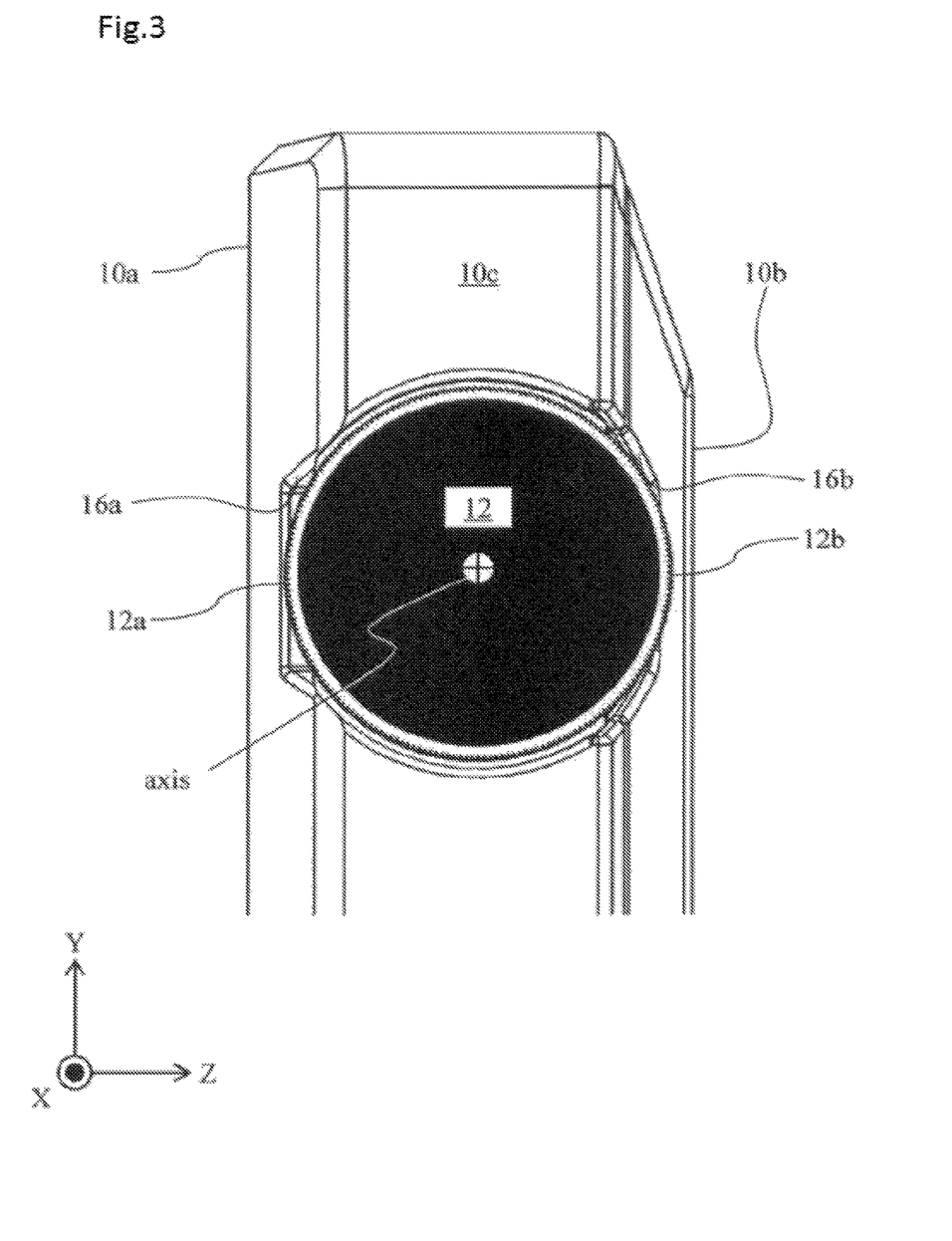
FIG. 3 is an enlarged side view of the rotary operator according to the embodiment.

FIG. 2 illustrates an enlarged perspective view of the rotary operator 12, and FIG. 3 illustrates an enlarged side view of the rotary operator 12.

As illustrated in FIGS. 2 and 3, the rotary operator 12 in the present embodiment is rotatably attached in a rotation plane (a YZ plane) perpendicular to the front surface 10a or the back surface 10b (an XY plane). That is, a rotation axis "axis" of the rotary operator 12 is parallel with the X-axis direction. The rotary operator 12 is in a substantially circular shape as viewed laterally, and the rotation axis "axis" passes through the center of the rotary operator 12.

The rotary operator 12 has a first contact region and a second contact region positioned on the opposite side of the first contact region with respect to the rotation axis "axis." The first contact region and the second contact region are regions contacting the user's finger when the rotary operator 12 is rotatably operated. In the present embodiment, a front region of the rotary operator 12 is the first contact region, and a back region of the rotary operator 12 is the second contact region. The user's finger contacts any one of the front region or the back region while sliding in a circumferential direction of the rotary operator 12. In this manner, the rotary operator 12 is rotatably operated. Note that the first contact region (the front region) and the second contact region (the back region) are two contact regions where a finger sliding direction is opposite to each other when the rotary operator 12 is rotated in a certain direction.

In the present embodiment, a top surface 12t of the rotary operator 12 is flat. Thus, the user's finger mostly contacts a front surface 12a of the rotary operator 12 in the front region or contacts a back surface 12b of the rotary operator 12 in the back region, thereby operating the rotary operator 12. As illustrated in FIG. 2, a cutout 16a and a cutout 16b are, in the present embodiment, each provided at the front surface 10a and the back surface 10b with the top surface 12t of the rotary operator 12 and the right surface 10c of the portable electronic device 10 being flush with each other. With this configuration, the front surface 12a is exposed to the outside in a front direction, and the back surface 12b is exposed to the outside in a back direction. Thus, the user's finger can contact the front surface 12a and the back surface 12b.

Note that in the present embodiment, the front surface 12a of the rotary operator 12 does not protrude from the front surface 10a of the portable electronic device 10, and similarly, the back surface 12b of the rotary operator 12 does not protrude from the back surface 10b of the portable electronic device 10. In light of further improvement of the operability of the rotary operator 12, the front surface 12a may protrude forward from the front surface 10a, or the back surface 12b may protrude backward from the back surface 10b.

The rotary operator 12 is rotatable in a forward direction and a reverse direction, and the volume value changes in a changing direction corresponding to a rotation direction of the rotary operator 12. In the present embodiment, a clockwise direction as viewed in FIG. 3 (i.e., as viewed from the right side) is the forward direction, and a counterclockwise direction is the reverse direction. For rotating the rotary operator 12 in the forward direction, the user slides the finger in an upward direction with the finger contacting the front surface 12a, or slides the finger in a downward direction with the finger contacting the back surface 12b. Moreover, for rotating the rotary operator 12 in the reverse direction, the user slides the finger in the downward direction with the finger contacting the front surface 12a, or slides the finger in the upward direction with the finger contacting the back surface 12b.

As described above, it is assumed that the user operates the rotary operator 12 with the finger of one hand while holding the portable electronic device 10 with the one hand. The rotary operator 12 is provided on the side close to the right surface 10c of the portable electronic device 10. Thus, in a case where the user holds the portable electronic device 10 with the right hand, the thumb of the right hand usually contacts the front surface 12a when the rotary operator 12 is rotatably operated. In a case where the user holds the portable electronic device 10 with the left hand, a finger (hereinafter merely referred to as an "index finger") of the left hand other than the thumb usually contacts the back surface 12b when the rotary operator 12 is rotatably operated.

Outer structures of the portable electronic device 10 and the rotary operator 12 are as described above. As long as the rotary operator 12 is rotatably operated in such a manner that the user slides the finger in the circumferential direction of the rotary operator 12 with the finger contacting any one of the first contact region or the second contact region, the rotary operator 12 may be attached to the portable electronic device 10 in other forms than that described above. For example, the rotary operator 12 may be rotatable in the plane (i.e., the XY plane) parallel with the front surface 10a, and may be rotatably operated with the user's finger contacting a left region or an upper region (e.g., a left surface or an upper surface) as the first contact region or a right region or a lower region (e.g., a right surface or a lower surface) as the second contact region.

Moreover, in the present embodiment, the rotary operator 12 is provided on the side close to the right surface 10c of the portable electronic device 10, but may be provided on the side close to the left surface 10d. Alternatively, the rotary operator 12 may be provided at a center portion in the right-to-left direction so that the rotary operator 12 can be rotatably operated from the front-to-back direction.

Figure 4:
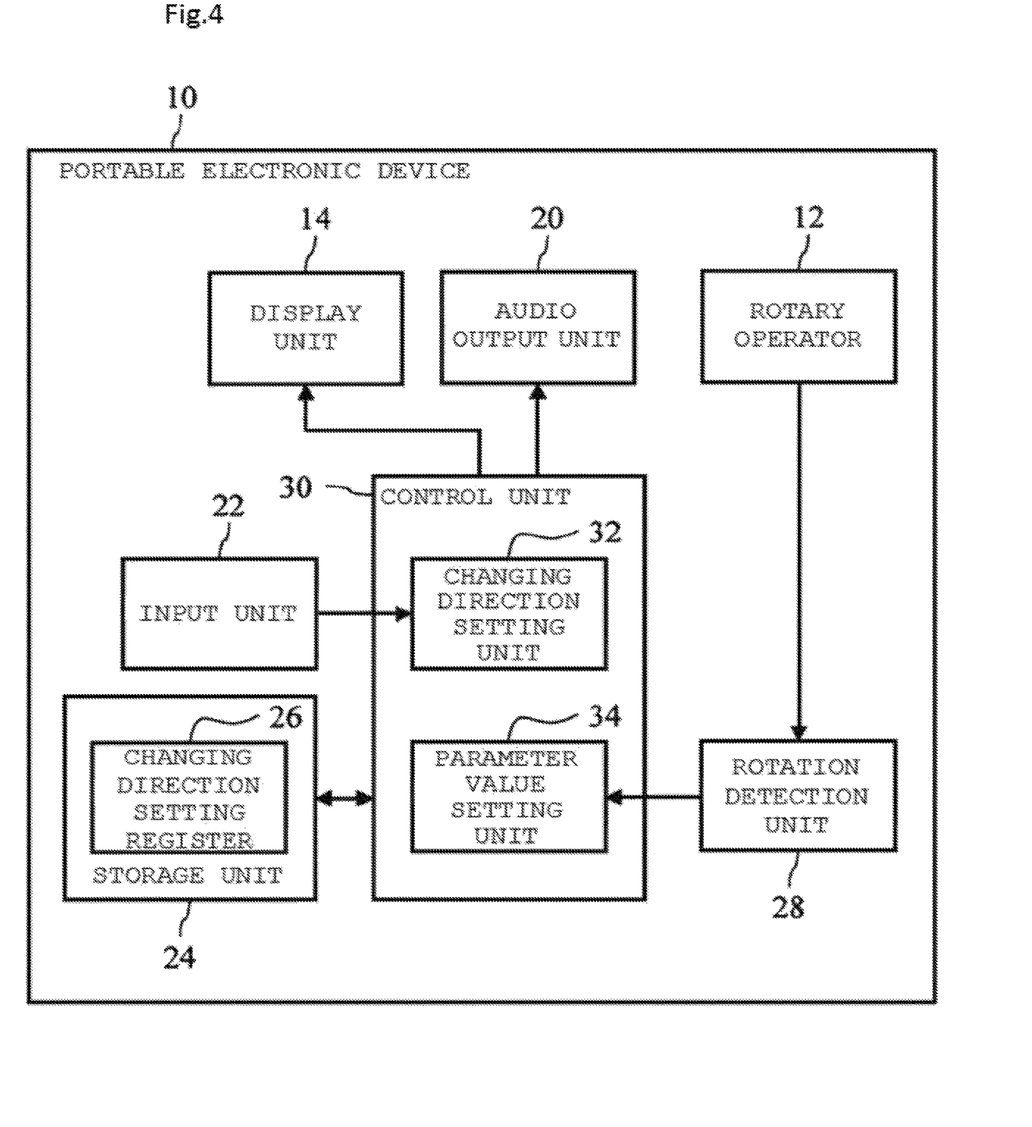
FIG. 4 is a functional block diagram of the portable electronic device according to the embodiment.

FIG. 4 illustrates a functional block diagram of the portable electronic device 10. Hereinafter, each unit of the portable electronic device 10 will be described with reference to FIG. 4.

The display unit 14 includes a liquid crystal panel, for example. Various types of information such as information regarding music being reproduced at the portable electronic device 10, the volume value, reproduction sound quality settings, and a reproduction counter are displayed on the display unit 14. Specifically, for displaying the volume value, the volume value changing direction with respect to the rotation direction of the rotary operator 12 is displayed in a form more easily recognizable by the user. The display form of the volume value will be described later. Moreover, a user interface used when the user operates the portable electronic device 10 is displayed on the display unit 14.

An audio output unit 20 includes a speaker, a speaker drive circuit, and an amplifier circuit, for example. The audio output unit 20 is configured to output, as audio, music targeted for a user's reproduction instruction with a volume value set by the user.

An input unit 22 includes a touch panel and a button, for example. The input unit 22 is for inputting a user's instruction to the portable electronic device 10.

A storage unit 24 includes a read only memory (ROM) or a random access memory (RAM), for example. The storage unit 24 is configured to store a program for operating each unit of the portable electronic device 10. Moreover, the storage unit 24 is configured to store various types of setting information on the portable electronic device 10 or music data, for example.

Further, a changing direction setting register 26 configured to store a value indicating the parameter value changing direction with respect to the rotation direction of the rotary operator 12 is defined for the storage unit 24. In the changing direction setting register 26 of the present embodiment, any of values "0" and "1" is stored. The value stored in the changing direction setting register 26 is determined by a later-described changing direction setting unit 32.

When the rotary operator 12 is rotated by the user, an electric signal corresponding to a rotation angle is output. The rotary operator 12 in the present embodiment outputs a pulse wave a predetermined number of times (e.g., 100 times) per rotation.

A rotation detection unit 28 is an angular position sensor configured to detect the rotation direction and rotation angle of the rotary operator 12. In the present embodiment, the rotation detection unit 28 is a rotary encoder configured to count the pulse waves output from the rotary operator 12, thereby detecting the rotation direction and rotation angle of the rotary operator 12. Information indicating the rotation direction and rotation angle of the rotary operator 12 detected by the rotation detection unit 28 is sent to a control unit 30. Note that the rotation detection unit 28 may be configured to detect the rotation direction and rotation angle of the rotary operator 12 by other methods than that described above. In a case where the rotation detection unit 28 outputs an analog signal indicating the rotation direction and rotation angle of the rotary operator 12, such a signal is subjected to A/D conversion processing before being input to the control unit 30.

The control unit 30 includes a central processing unit (CPU) or a microcomputer, for example. The control unit 30 is configured to control each unit of the portable electronic device 10 according to the program stored in the storage unit 24. Moreover, as illustrated in FIG. 4, the control unit 30 also functions as the changing direction setting unit 32 and a parameter value setting unit 34.

The changing direction setting unit 32 is configured to set the changing direction of the parameter value (the volume value in the present embodiment) with respect to the rotation direction of the rotary operator 12. In the present embodiment, the changing direction setting unit 32 is configured to set the volume value changing direction based on a user's instruction. The changing direction setting unit 32 is configured to set the volume value changing direction based on whether "0" or "1" is stored in the changing direction setting register 26.

Specifically, in a case where a "forward changing direction" as a first changing direction is specified as the changing direction by the user, the changing direction setting unit 32 stores "0" in the changing direction setting register 26. Such a setting is a setting for increasing the volume value in the case of rotating the rotary operator 12 in the forward direction and decreasing the volume value in the case of rotating the rotary operator 12 in the reverse direction. On the other hand, in a case where a "reverse changing direction" as a second changing direction is specified as the changing direction by the user, the changing direction setting unit 32 stores "1" in the changing direction setting register 26. Such a setting is a setting for decreasing the volume value in the case of rotating the rotary operator 12 in the forward direction and increasing the volume value in the case of rotating the rotary operator 12 in the reverse direction.

Various methods are conceivable as the method for specifying the volume value changing direction by the user. For example, setting items of the portable electronic device 10 may include a setting item regarding the volume value changing direction, and the user may specify the "forward changing direction" or the "reverse changing direction" on a screen for selecting a set value for the above-described setting item with such a screen being displayed on the display unit 14. In this case, the changing direction setting unit 32 stores, in the changing direction setting register 26, a value corresponding to user's input on the above-described screen.

Alternatively, the rotary operator 12 may be, after predetermined operation has been performed for the portable electronic device 10, rotatably operated so that the volume value changing direction can be specified. For example, the "forward changing direction" may be specified in a case where the user rotates the rotary operator 12 in the forward direction after having performed the predetermined operation. As another alternative, the "reverse changing direction" may be specified in a case where the user rotates the rotary operator 12 in the reverse direction after having performed the predetermined operation. In other words, the rotation direction in which the rotary operator 12 is operated after the predetermined operation has been performed is specified as the direction of increasing the volume value. Such a specifying method is employed so that the user can specify, in a more intuitive way, the volume value changing direction with respect to the rotation direction of the rotary operator 12. In this case, the changing direction setting unit 32 stores, in the changing direction setting register 26, a value corresponding to the rotation direction of the rotary operator 12 after the predetermined operation has been performed.

Note that various types of operation are conceivable as the predetermined operation performed for the portable electronic device 10 before the volume value changing direction is specified. For example, the volume value changing direction may be specified in such a manner that the rotary operator 12 is rotatably operated while a predetermined button (which may be a button on the touch panel) provided at the portable electronic device 10 is being pressed, or may be specified in such a manner that the rotary operator 12 is rotatably operated after a volume changing direction setting mode is brought by a predetermined operation sequence.

The parameter value setting unit 34 is configured to take detection of rotation of the rotary operator 12 by the rotation detection unit 28 as a trigger, thereby changing the parameter value (the volume value in the present embodiment) of the portable electronic device 10 based on the rotation direction and rotation angle of the rotary operator 12 detected by the rotation detection unit 28 and the value stored in the changing direction setting register 26.

Specifically, when the rotation detection unit 28 detects rotation of the rotary operator 12, the parameter value setting unit 34 first specifies the volume value changing direction from the value stored in the changing direction setting register 26. That is, when the value stored in the changing direction setting register 26 is "0," the volume value changing direction is the "forward changing direction." When the value stored in the changing direction setting register 26 is "1," the volume value changing direction is the "reverse changing direction."

Thereafter, in a case where the volume value changing direction is the "forward changing direction," the parameter value setting unit 34 increases the volume value according to the rotation angle of the rotary operator 12 when the rotary operator 12 is rotated in the forward direction, and decreases the volume value according to the rotation angle of the rotary operator 12 when the rotary operator 12 is rotated in the reverse direction. On the other hand, in a case where the volume value changing direction is the "reverse changing direction," the parameter value setting unit 34 decreases the volume value according to the rotation angle of the rotary operator 12 when the rotary operator 12 is rotated in the forward direction, and increases the volume value according to the rotation angle of the rotary operator 12 when the rotary operator 12 is rotated in the reverse direction.

Assuming the case of setting the volume value changing direction as the "forward changing direction," when the portable electronic device 10 is held with the right hand, the user slides, for increasing the volume value, the thumb of the right hand upward with the finger contacting the front surface 12a of the rotary operator 12 for rotating the rotary operator 12 in the forward direction. In this case, the changing direction of "increasing" the volume value and the operation of sliding the finger "upward" are intuitively consistent with each other. On the other hand, when the user attempts to increase the volume value in the case of holding the portable electronic device 10 with the left hand, e.g., the index finger of the left hand needs to slide downward with the finger contacting the back surface 12b of the rotary operator 12 for rotating the rotary operator 12 in the forward direction. In this case, the changing direction of "increasing" the volume value and the operation of sliding the finger "downward" are not intuitively consistent with each other.

According to the present embodiment, in such a case, i.e., the case of operating the rotary operator 12 from the back surface 12b with the user holding the portable electronic device 10 with the left hand, the user can change the volume value changing direction to the "reverse changing direction." When the volume value changing direction is set to the "reverse changing direction," e.g., the index finger of the left hand may only need to slide upward with the finger contacting the back surface 12b of the rotary operator 12 in the case of holding the portable electronic device 10 with the user's left hand and attempting to increase the volume value. With this configuration, the rotary operator 12 is rotated in the reverse direction to increase the volume value. That is, even in the case of rotary operation from the back surface 12b, the changing direction of "increasing" the volume value and the operation of sliding the finger "upward" are intuitively consistent with each other.

As described above, according to the present embodiment, the volume value changing direction is properly set so that the finger sliding direction and the volume value changing direction can be intuitively consistent with each other even in the case of rotary operation from any of the front surface 12a and the back surface 12b.

Figure 5A:
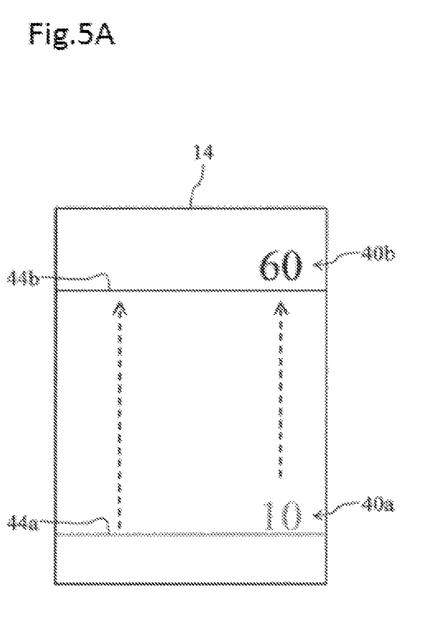
FIGS. 5A and 5B are views of display examples of the direction of changing a parameter.
Figure 5B:
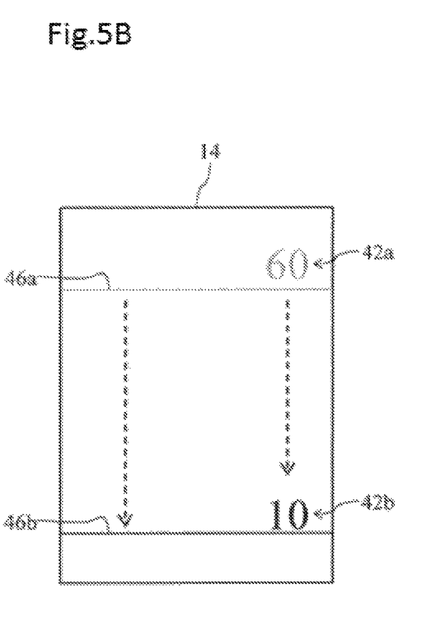

FIGS. 5A and 5B illustrate examples of a display screen of the display unit 14 in a case where the user rotatably operates the rotary operator 12 to change the volume value. In the portable electronic device 10 of the present embodiment, the volume value changing direction can be set as necessary, and for this reason, there might be a case where the user cannot grasp whether a current volume value changing direction is the "forward changing direction" or the "reverse changing direction." Thus, in the portable electronic device 10, the volume value changing direction is displayed in a clearer form on the display unit 14 so that the user can more easily grasp the volume value changing direction.

FIG. 5A illustrates a state of a change in the displayed volume value on the display unit 14 in a case where the volume value changing direction is the "forward changing direction" and the rotary operator 12 is rotated in the forward direction or a case where the volume value changing direction is the "reverse changing direction" and the rotary operator 12 is rotated in the reverse direction (i.e., the case of increasing the volume). A numerical value displayed on the display unit 14 indicates the volume value. As illustrated in FIG. 5A, not only the numerical value indicating the volume value is merely changed, but also the display position of the numerical value is changed according to the volume value in the present embodiment. More specifically, in the case of increasing the volume value, the numerical value indicating the volume value moves from the lower side to the upper side of the display unit 14. In the example of FIG. 5A, the numerical value is displayed at a position indicated by a reference numeral 40a when the volume value is "10." The display position of the numerical value gradually moves upward as the volume value increases, and reaches a position indicated by a reference numeral 40b when the volume value reaches "60."

Moreover, FIG. 5B illustrates a state of a change in the displayed volume value on the display unit 14 in a case where the volume value changing direction is the "forward changing direction" and the rotary operator 12 is rotated in the reverse direction or a case where the volume value changing direction is the "reverse changing direction" and the rotary operator 12 is rotated in the forward direction (i.e., the case of decreasing the volume). In the present embodiment, in the case of decreasing the volume, not only a numerical value indicating the volume value is, as in the case of increasing the volume, merely changed, but also the display position of such a numerical value is changed according to the volume value. More specifically, in the case of decreasing the volume value, the numerical value indicating the volume value moves from the upper side to the lower side of the display unit 14. In the example of FIG. 5B, the numerical value is displayed at a position indicated by a reference numeral 42a when the volume value is "60." The display position of the numerical value gradually moves downward as the volume value decreases, and reaches a position indicated by a reference numeral 42b when the volume value reaches "10."

With the display form of the volume value as described above, the user can more easily grasp the volume value changing direction at least as compared to the case of merely changing the numerical value indicating the volume value at a fixed position.

Further, for much more clearly displaying the volume value changing direction, a graphic indicating the volume value may be, in addition to the numerical value indicating the volume value, displayed on the display unit 14. For example, as illustrated in FIG. 5A, a bar indicating the volume value may be displayed. In this case, the bar indicating the volume value also moves from the lower side to the upper side of the display unit 14 in the case of increasing the volume value. For example, when the volume value is "10," the bar is displayed at a position indicated by a reference numeral 44a. The display position of the bar gradually moves upward as the volume value increases, and reaches a position indicated by a reference numeral 44b when the volume value reaches "60." Similarly, in the case of decreasing the volume value as illustrated in FIG. 5B, the bar indicating the volume value moves from the upper side to the lower side of the display unit 14. For example, when the volume value is "60," the bar is displayed at a position indicated by a reference numeral 46a. The display position of the bar gradually moves downward as the volume value decreases, and reaches a position indicated by a reference numeral 46b when the volume value reaches "10."

Alternatively, the volume value changing direction may be displayed on a steady basis on the display unit 14 or other indicators of the portable electronic device 10.

Figure 6:
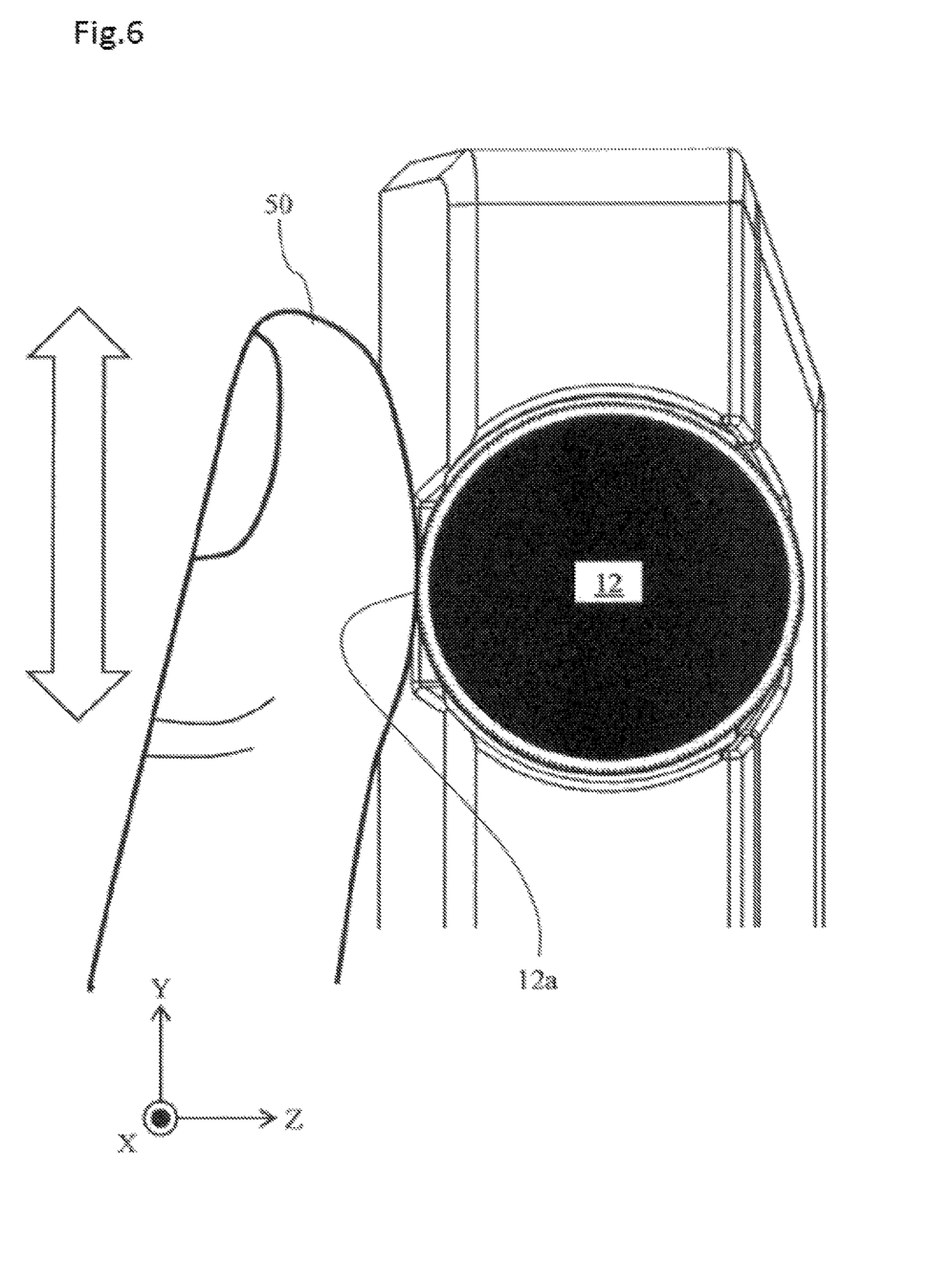
FIG. 6 is a view of a state when the portable electronic device is held with the right hand and the rotary operator is operated with the thumb of the right hand from a front side.
Figure 7:
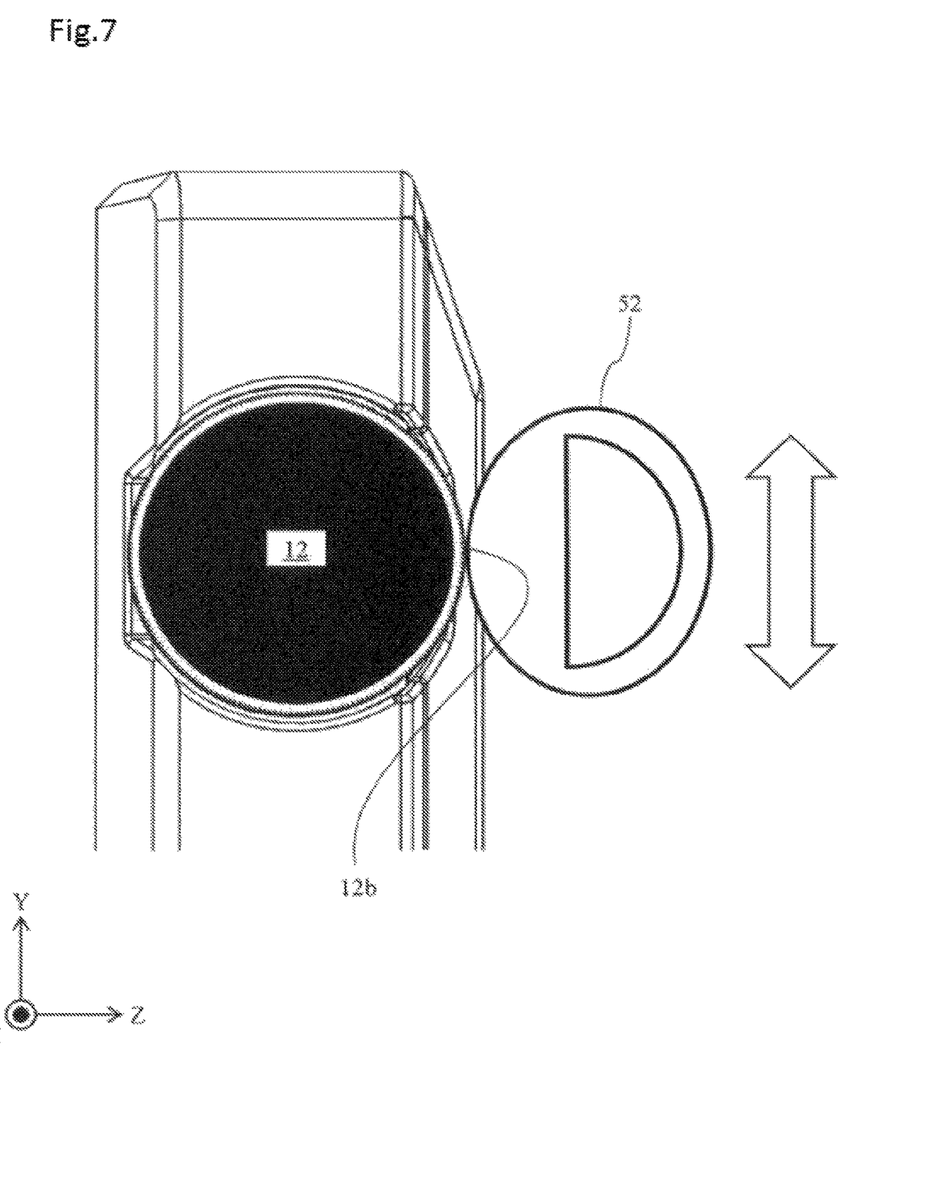
FIG. 7 is a view of a state when the portable electronic device is held with the left hand and the rotary operator is rotated with the index finger of the left hand from a back side.

FIG. 6 illustrates a state when the user holds the portable electronic device 10 with the right hand and the thumb of the right hand performs rotary operation for the front surface 12a, and FIG. 7 illustrates a state when the user holds the portable electronic device 10 with the left hand and the index finger of the left hand performs rotary operation for the back surface 12b.

As illustrated in FIG. 6, in a case where the user holds the portable electronic device 10 with the right hand and the thumb of the right hand performs rotary operation for the front surface 12a, an extension direction of the thumb of the right hand is usually the upper-to-lower direction. That is, such an extension direction is a direction parallel with the finger sliding direction for rotary operation of the rotary operator 12. On the other hand, as illustrated in FIG. 7, in a case where the user holds the portable electronic device 10 with the left hand and the index finger of the left hand performs rotary operation for the back surface 12b, an extension direction of the index finger of the left hand is usually the right-to-left direction. That is, such an extension direction is a direction perpendicular to the finger sliding direction for rotary operation of the rotary operator 12.

Due to such a configuration, a rotatable amount (the rotation angle) per stroke is greater in the case of performing rotary operation for the front surface 12a with the thumb of the right hand than in the case of performing rotary operation for the back surface 12b with the index finger of the left hand. This is because of the following reason: in the case of performing rotary operation for the front surface 12a with the thumb of the right hand, the rotary operator 12 can be rotated with one stroke in such a manner that the thumb slides from a state in which a tip end portion of the thumb contacts the front surface 12a until the front surface 12a comes into contact with the periphery of the first joint of the thumb; whereas in the case of performing rotary operation for the back surface 12b with the index finger of the left hand, the rotary operator 12 cannot be rotated with one stroke because the finger can only slide by the width of the index finger.

It is assumed that the volume value changing direction is usually set to the "forward changing direction" in the case of performing rotary operation for the front surface 12a with the thumb of the right hand, and is usually set to the "reverse changing direction" in the case of performing rotary operation for the back surface 12b with the index finger of the left hand.

In view of above, the parameter value setting unit 34 may change the volume value such that the amount of change in the volume value per unit rotation angle of the rotary operator 12 in the case of setting the volume value changing direction to the "forward changing direction" and the amount of change in the volume value per unit rotation angle of the rotary operator 12 in the case of setting the volume value changing direction to the "reverse changing direction" are different from each other.

Specifically, the parameter value setting unit 34 sets the amount of change in the volume value per unit angle in the case of setting the volume value changing direction to the "reverse changing direction" to an amount greater than the amount of change in the volume value per unit angle in the case of setting the volume value changing direction to the "forward changing direction." With this configuration, even in the case of performing rotary operation for the back surface 12b with the index finger of the left hand (the case of a small rotation amount per stroke), the volume can be greatly changed with a small rotation angle.

The outline of the configuration of the portable electronic device 10 of the present embodiment is as described above. Hereinafter, the flow of processing of the portable electronic device 10 of the present embodiment will be described with reference to a flowchart shown in FIG. 8. Note that in advance of start of the processing of the flowchart of FIG. 8, the user has already specified the volume changing direction, and "0" or "1" has been stored in the changing direction setting register 26.

Figure 8:
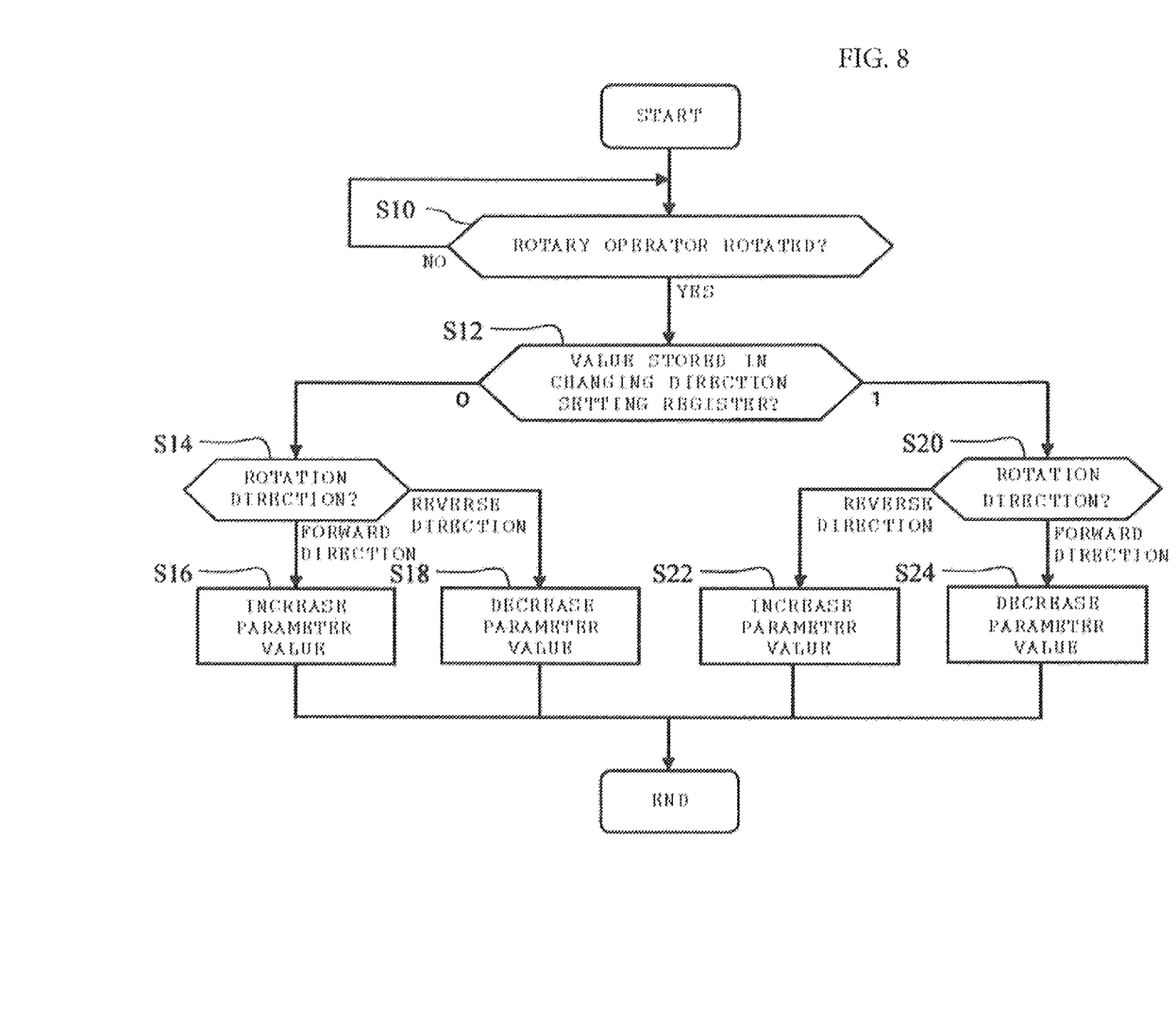
FIG. 8 is a flowchart of the flow of processing of the portable electronic device of the embodiment.

At a step S10, the rotation detection unit 28 determines whether or not the rotary operator 12 has been rotated. In a case where the rotary operator 12 has been rotated, the processing proceeds to a step S12. In a case where the rotary operator 12 has not been rotated, the processing stands by until the rotary operator 12 is rotated.

At the step S12, determination on the parameter value is made based on the value stored in the changing direction setting register 26. That is, it is determined whether the volume value changing direction is the "forward changing direction" or the "reverse changing direction." In a case where "0" is stored in the changing direction setting register 26, i.e., a case where the volume value changing direction is the "forward changing direction," the processing proceeds to a step S14.

At the step S14, the parameter value setting unit 34 determines the rotation direction of the rotary operator 12 based on the signal from the rotation detection unit 28. The processing proceeds to a step S16 in a case where the rotary operator 12 has been rotated in the forward direction, and proceeds to a step S18 in a case where the rotary operator 12 has been rotated in the reverse direction.

At the step S16, the parameter value setting unit 34 increases the volume value by an amount corresponding to the rotation amount of the rotary operator 12 detected by the rotation detection unit 28.

At the step S18, the parameter value setting unit 34 decreases the volume value by the amount corresponding to the rotation amount of the rotary operator 12 detected by the rotation detection unit 28.

At the step S12, in a case where "1" is stored in the changing direction setting register 26, i.e., a case where the volume value changing direction is the "reverse changing direction," the processing proceeds to a step S20.

At the step S20, the parameter value setting unit 34 determines, as in the step S14, the rotation direction of the rotary operator 12 based on the signal from the rotation detection unit 28. The processing proceeds to a step S22 in a case where the rotary operator 12 has been rotated in the reverse direction, and proceeds to a step S24 in a case where the rotary operator 12 has been rotated in the forward direction.

At the step S22, the parameter value setting unit 34 increases the volume value by the amount corresponding to the rotation amount of the rotary operator 12 detected by the rotation detection unit 28.

At the step S24, the parameter value setting unit 34 decreases the volume value by the amount corresponding to the rotation amount of the rotary operator 12 detected by the rotation detection unit 28.

The embodiment of the present disclosure has been described above, but the present disclosure is not limited to the above-described embodiment. Various changes can be made without departing from the gist of the present disclosure.

The invention claimed is:

1. An electronic device comprising:
a rotary operator configured to change a parameter value of the electronic device, the rotary operator having a first contact region and a second contact region positioned on an opposite side of the first contact region with respect to a rotation axis of the rotary operator and being rotatably operated in such a manner that a finger of a user slides in a circumferential direction of the rotary operator with the finger contacting any of the first and second contact regions; and
processing circuitry that sets a changing direction of the parameter value with respect to a rotation direction of the rotary operator such that, in a case where the changing direction of the parameter value is set to a first direction, the parameter value increases in response to the rotary operator being rotated in a first rotation direction and the parameter value decreases in response to the rotary operator being rotated in a second rotation direction opposite to the first rotation direction, while in a case where the changing direction of the parameter value is set to a second direction, the parameter value decreases in response to the rotary operator being rotated in the first rotation direction and the parameter value increases in response to the rotary operator being rotated in the second rotation direction, wherein
the rotary operator is provided on one side of the electronic device, and
the first contact region is exposed toward a front side of the electronic device, and the second contact region is exposed toward a back side of the electronic device.

2. The electronic device according to claim 1, wherein
the electronic device is a portable electronic device holdable with one hand, and
the rotary operator is rotatably operated with a finger of the one hand holding the electronic device.

3. The electronic device according to claim 1, wherein
the rotary operator rotates in a rotation plane perpendicular to a front surface of the electronic device.

4. The electronic device according to claim 1, further comprising:
a display configured to display the changing direction of the parameter value by operation of the rotary operator.

5. The electronic device according to claim 1, wherein
the processing circuitry determines the changing direction of the parameter value according to a rotation direction of the rotary operator after predetermined operation has been performed for the electronic device.

6. The electronic device according to claim 1, wherein
the processing circuitry is configured to change the parameter value based on the changing direction of the parameter value set by the processing circuitry, the rotation direction of the rotary operator, and a rotation angle of the rotary operator, and
the processing circuitry is configured to change the parameter value such that a first amount of change in the parameter value per unit rotation angle in the case where the changing direction of the parameter value is set to the first direction and a second amount of change in the parameter value per unit rotation angle in the case where the changing direction of the parameter value is set to the second direction are different from each other.

7. The electronic device according to claim 1, wherein
the rotary operator is provided on a right side of the electronic device from a front view of the electronic device.

8. The electronic device according to claim 6, wherein
in the case where the changing direction of the parameter value is set to the first direction, the parameter value increases in response to the first contact region of the rotary operator being rotated toward an upper direction and the parameter value decreases in response to the first contact region of the rotary operator being rotated toward a lower direction, and
the first amount of change in the parameter value per unit rotation angle is smaller than the second amount of change in the parameter value per unit rotation angle.

9. The electronic device according to claim 1, wherein
a first side and a second side of the rotary operator, excluding the first contact region and the second contact region of the rotary operator, are covered by the side of the electronic device.

10. The electronic device according to claim 9, wherein
the first side of the rotary operator is provided on an opposite side of the second side of the rotary operator.

11. The electronic device according to claim 10, wherein
the first side, the first contact region, the second side, and the second contact region of the rotary operator are located around the rotary operator in this order.

* * * * *